United States Patent
Faler et al.

(10) Patent No.: US 11,015,084 B2
(45) Date of Patent: *May 25, 2021

(54) COATING COMPOSITIONS AND ELASTIC BARRIER COATINGS FORMED THEREFROM

(71) Applicant: PPG Industries Ohio, Inc., Cleveland, OH (US)

(72) Inventors: Dennis Leroy Faler, North Huntingdon, PA (US); Roxalana L. Martin, Pittsburgh, PA (US); Jennifer Tamaki Jordan, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/709,711

(22) Filed: Sep. 20, 2017

(65) Prior Publication Data
US 2019/0085203 A1 Mar. 21, 2019

(51) Int. Cl.
| | | |
|---|---|---|
| C09D 187/00 | (2006.01) | |
| C09D 7/12 | (2006.01) | |
| B60C 5/14 | (2006.01) | |
| C09D 7/63 | (2018.01) | |
| C09D 5/02 | (2006.01) | |
| C09D 151/08 | (2006.01) | |
| C09D 175/14 | (2006.01) | |
| B32B 25/08 | (2006.01) | |
| B32B 27/20 | (2006.01) | |

(52) U.S. Cl.
CPC .......... *C09D 187/005* (2013.01); *B32B 25/08* (2013.01); *B32B 27/20* (2013.01); *C09D 5/022* (2013.01); *C09D 7/63* (2018.01); *C09D 151/08* (2013.01); *C09D 175/14* (2013.01); *C08L 2207/53* (2013.01); *Y10T 428/254* (2015.01)

(58) Field of Classification Search
None
See application file for complete search history.

(56) References Cited

U.S. PATENT DOCUMENTS

| | | | |
|---|---|---|---|
| 6,203,913 B1 | 3/2001 | Kondos et al. | |
| 6,277,905 B1 * | 8/2001 | Keep | C08K 5/3417 524/120 |
| 2004/0068036 A1 * | 4/2004 | Halladay | C08J 7/047 524/439 |
| 2005/0197480 A1 | 9/2005 | Temple et al. | |
| 2018/0230327 A1 | 8/2018 | Kanda | |
| 2019/0085200 A1 * | 3/2019 | Jordan | C09D 163/00 |

FOREIGN PATENT DOCUMENTS

| | | |
|---|---|---|
| EP | 0765922 A1 | 4/1997 |
| JP | 200784730 A | 4/2007 |
| JP | 20081779 A | 1/2008 |
| JP | 200813741 A | 1/2008 |
| JP | 201053340 A | 3/2010 |
| JP | 201126463 A | 2/2011 |
| JP | 201169020 A | 4/2011 |
| JP | 2010255153 A | 11/2011 |
| JP | 2012101611 A | 5/2012 |
| JP | 2012101612 A | 5/2012 |
| JP | 2012214928 A | 11/2012 |
| JP | 2014129484 A | 7/2014 |
| JP | 2014161832 A | 9/2014 |
| JP | 20156737 A | 1/2015 |
| KR | 101098516 B1 | 12/2011 |
| KR | 101086454 B1 | 11/2015 |
| WO | 8501250 A1 | 3/1985 |
| WO | 9747401 A1 | 12/1997 |
| WO | 03/089487 | 10/2003 |
| WO | 2005105425 A2 | 11/2005 |
| WO | 2010015494 A2 | 2/2010 |
| WO | 2011127641 A1 | 10/2011 |
| WO | 2013/027093 | 2/2013 |
| WO | 2015030955 A1 | 3/2015 |
| WO | 2017/160398 | 9/2017 |
| WO | WO-2017160398 A1 * | 9/2017 ............ B05D 7/54 |

(Continued)

OTHER PUBLICATIONS

Boguslayskaya et al., "Effect of rubber functional groups on the intensity of rubber-filled interfacial interactions", Kauchuk i Rezina, 1988, vol. 11, pp. 14-17.

Erielev et al., "Synthesis and chemical modification of rubber latexes containing ketonic groups", Kauchuk i Rezina, 1973, vol. 32 (8), pp. 7-10.

Hirose et al., The structure and properties of core-shell type acrylic-polyurethane hybrid aqueous emulsions, Progress in Organic Coatings, 1997, vol. 31, pp. 157-169.

Jin, Jing et al. Better Rubber to Substrate Adhesion via Better Interfacial Chemistry, Fall 178th meeting of the Rubber Division of the American Chemical Society., 2010, 1-19, Paper #97, Milwaukee, WI.

Kessel et al. The diacetone acrylamide crosslinking reaction and its influence on the film formation of an acrylic latex, J. Coat. Technol. Res., 2008, vol. 5:3, pp. 285-297.

(Continued)

*Primary Examiner* — Cheng Yuan Huang
(74) *Attorney, Agent, or Firm* — Michael J. Grese

(57) ABSTRACT

An elastic barrier coating composition includes an aqueous dispersion of core-shell particles and an elastomeric polymer that is different from the aqueous dispersed core-shell particles. The aqueous dispersion of core-shell particles include an aqueous medium and core-shell particles dispersed in the aqueous medium. The core-shell particles have a polymeric core at least partially encapsulated by a polymeric shell in which the polymeric shell includes: (i) a barrier segment comprising aromatic groups and urethane linkages, urea linkages, or a combination thereof; and (ii) an elastomeric segment that is different from (i). The barrier segment includes at least 30 weight % of the polymeric shell based on the total solids weight of the polymeric shell. Further, the polymeric shell is covalently bonded to at least a portion of the polymeric core.

18 Claims, 5 Drawing Sheets

(56) References Cited

FOREIGN PATENT DOCUMENTS

WO     2017/180220     10/2017
WO     2017038306 A1     6/2018

OTHER PUBLICATIONS

Navarro-Banon et al., "Water-based chlorination treatment of SBS rubber soles to improve their adhesion to waterborne polyurethane adhesives in the footwear industry." J. Adhesion Sci. Technol., Jun. 13, 2005, 947-974, 9:11.
Okamoto et al., Urethane/acrylic composite polymer emulsions, Progress in Organic Coatings, 1996, vol. 29, pp. 175-182.
Zhang et al., The Diacetone Acrylamide Crosslinking Reaction and Its Control of Core-Shell Polyacrylate Lactices at Ambient Temperature, Journal of Applied Polymer Science, 2012, vol. 123, pp. 1822-1832.

\* cited by examiner

COATING COMPOSITIONS AND ELASTIC BARRIER COATINGS FORMED THEREFROM

FIELD OF THE INVENTION

The present invention relates to coating compositions, elastic barrier coatings formed from the coating compositions, and substrates coated with elastic barrier coatings.

BACKGROUND OF THE INVENTION

Barrier coatings are used in a variety of industries to reduce permeation of vapor, gas, and/or chemicals through a substrate. For instance, barrier coatings are typically applied to tires and to bladders of sporting equipment such as shoes and balls to reduce the ingress and egress of gas. While barrier coatings can reduce the permeation of vapor, gas, and/or chemicals, they are generally brittle at low temperatures such as at −40° C. and, therefore, have a negative effect on the elasticity of the substrate. It is, therefore, desirable to develop improved coatings that provide good elasticity and gas barrier performance at both high and low temperatures. The present invention, therefore, aims to provide coating compositions from which barrier coatings can be formed, which exhibit good elasticity and barrier properties at ambient and elevated temperatures, as well as at substantially lower temperatures.

SUMMARY OF THE INVENTION

The present invention relates to an elastic barrier coating composition comprising an aqueous dispersion of core-shell particles and an elastomeric polymer that is different from the aqueous dispersed core-shell particles. The aqueous dispersion of core-shell particles comprises an aqueous medium and core-shell particles dispersed in the aqueous medium. The core-shell particles include a polymeric core at least partially encapsulated by a polymeric shell in which the polymeric shell comprises: (i) a barrier segment comprising aromatic groups and urethane linkages, urea linkages, or a combination thereof; and (ii) an elastomeric segment that is different from (i). The barrier segment comprises at least 30 weight % of the polymeric shell based on the total solids weight of the polymeric shell. Further, the polymeric shell is covalently bonded to at least a portion of the polymeric core.

The present invention also relates to a substrate at least partially coated with a coating formed from a coating composition according to the present invention.

DESCRIPTION OF THE INVENTION

Figure 1:
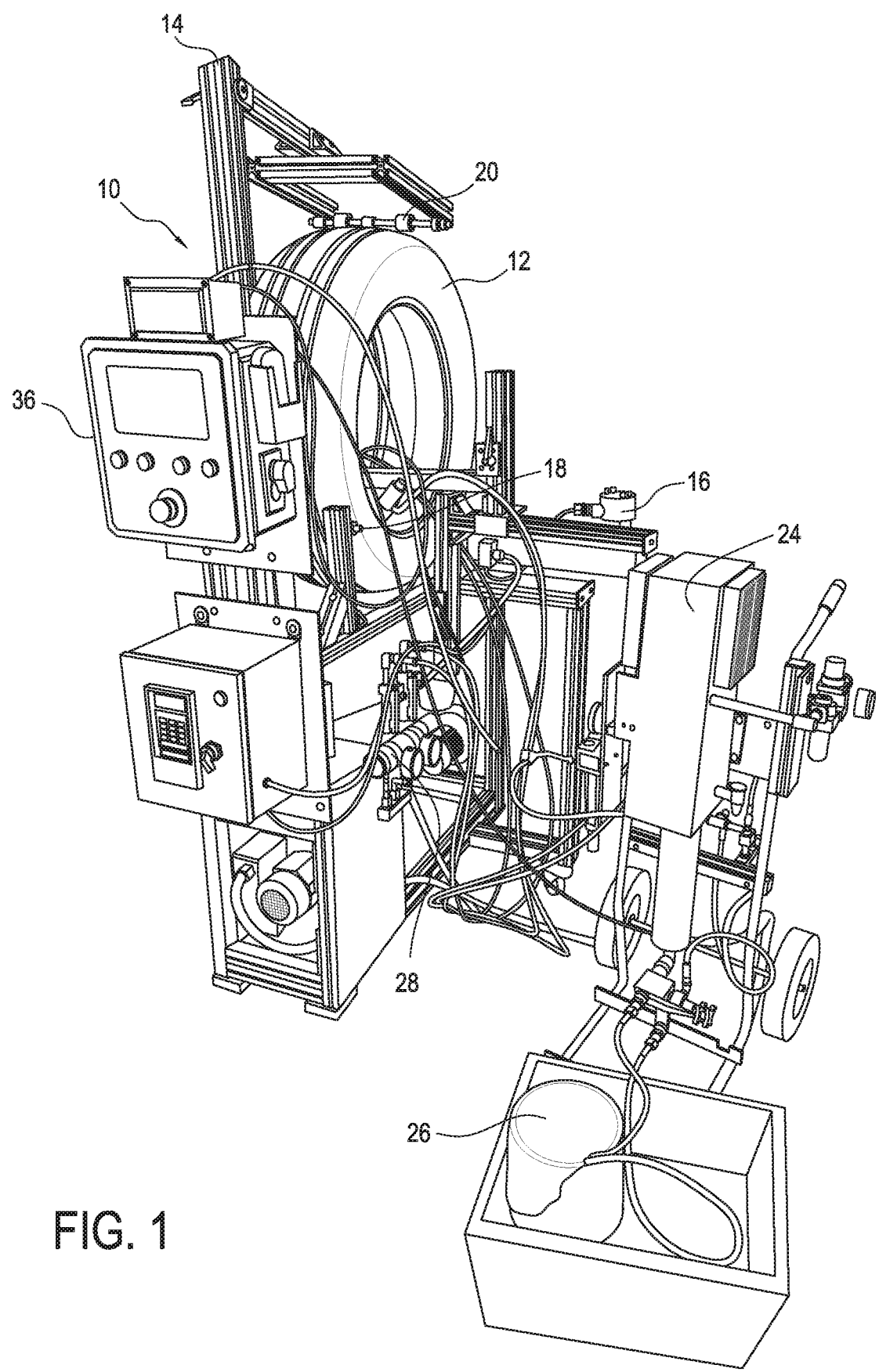
FIG. 1 is a perspective view of a device for spraying a coating composition to a passenger tire according to the present invention.

The present invention relates to a coating composition comprising an elastic barrier coating composition comprising core-shell particles dispersed in an aqueous medium. The core-shell particles include a polymeric core at least partially encapsulated by a polymeric shell in which the polymeric shell comprises: (i) a barrier segment comprising aromatic groups and urethane linkages, urea linkages, or a combination thereof; and (ii) an elastomeric segment that is different from (i).

As used herein, an "aqueous medium" refers to a liquid medium comprising at least 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

The aqueous dispersed core-shell particles of the present invention can comprise a core that is at least partially encapsulated by the shell. A core-shell particle in which the core is at least partially encapsulated by the shell refers to a particle comprising (i) at least a first material that forms the center of the particle (i.e., the core) and (ii) at least a second material (i.e., the shell) that forms a layer over at least a portion of the surface of the first material (i.e., the core). Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

The core-shell particles can comprise a polymeric core as well as a polymeric shell. A "polymeric core" means that the core of the core-shell particle comprises one or more polymers and a "polymeric shell" means that the shell of the core-shell particle comprises one or more polymers. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

As indicated, the polymeric shell of the core-shell particles comprises a barrier segment(s) and an elastomeric segment(s). As used herein, the term "barrier segment", with respect to a polymer, refers to a section or sections on the backbone of a polymer that imparts a vapor barrier, gas barrier, and/or chemical barrier when formed into a coating. For example, a polymer comprising the barrier segment(s) can be applied as a coating over the substrate to provide a vapor barrier, gas barrier, and/or chemical barrier. "Vapor barrier" refers to a barrier and/or low permeability to liquid and/or its vapor. "Gas barrier" refers to a barrier and/or low permeability to oxygen, nitrogen, argon, carbon dioxide, and/or other gases. "Chemical barrier" refers to a barrier and/or low permeability to the migration of a molecule from one substrate to another, and/or from within a substrate, e.g. from its interior to its surface or vice versa. Any resistance to permeation of vapor, gas, and/or chemical(s) is sufficient to qualify a coating as a "barrier coating" according to the present invention.

The gas barrier properties of a substrate, and/or any coatings thereon, are typically described in terms of the oxygen permeance ("P(O$_2$)"). The "P(O$_2$)" number quantifies the amount of oxygen that can pass through a substrate and/or coating under a specific set of conditions and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at 23° C. and 50% relative humidity (R.H.) conditions.

The barrier segment(s) of the polymeric shell of the core-shell particles contained in the coating composition according to the present invention generally comprise(s) aromatic groups as well as urethane linkages, urea linkages, or combinations thereof. In some examples, the polymer that forms at least a portion of the polymeric shell is a polyurethane based polymer comprising aromatic groups, urethane linkages and, optionally, urea linkages that form the barrier segment(s) and additional different segment(s) that form the elastomeric segment(s). The polyurethane based polymer can be formed according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may for example react with an isocyanate group to form a urethane linkage. A primary or secondary amine group may react with an isocyanate group to form a urea linkage. Generally the reaction mixture includes at least one hydroxyl-functional reactive compound such as a polyol for formation of urethane functionality.

Typically the compound(s) having functional groups that are reactive with the isocyanate functionality of the polyisocyanate comprise at least one compound having two or more active hydrogen-containing functional groups, e.g. selected from those mentioned above, per molecule as well as least one compound having one or more active hydrogen-containing functional groups and an ethylenically unsaturated component. As used herein, "ethylenically unsaturated" refers to a group having at least one carbon-carbon double bond. Non-limiting examples of ethylenically unsaturated groups include, but are not limited to, (meth) acrylate groups, vinyl groups, and combinations thereof. As used herein, the term "(meth)acrylate" refers to both the methacrylate and the acrylate.

Non-limiting examples of such reactive compounds include polyols, polyisocyanates, compounds containing carboxylic acid groups including diols containing carboxylic acid groups, hydroxyl functional ethylenically unsaturated components such as hydroxyalkyl esters of (meth)acrylic acid, polyamines, polythiols, and/or other compounds having reactive functional groups, such as hydroxyl groups, thiol groups, amine groups, and carboxylic acids. In some examples, an aromatic polyisocyanate and/or an aromatic compound(s) having functional groups that are reactive with the isocyanate functionality of the polyisocyanate are used in the preparation of the polymer to introduce aromatic barrier segment(s) in the polyurethane polymer.

It is appreciated that polyamines and other art recognized compounds can be used as a chain extender. As used herein, a "chain extender" refers to a lower molecular weight compound having two or more functional groups that are reactive towards isocyanate functional compounds.

Polyisocyanates that can be used in the preparation of the polymer having barrier and elastomeric segments include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof. A polyisocyanate that comprises one or more aromatic group(s) such as toluene diisocyanate (TDI), m-xylylenediisocyanate (MXDI), p-xylylenediisocyanate, and/or 4,4'-dibenzyl diisocyanate can also be used in the preparation of the polymer to form aromatic barrier segment(s).

Examples of polyols that can be used to prepare the polyurethane based polymer include, but are not limited to, polyether polyols, polyester polyols, copolymers thereof, as well as other compounds that comprise two or more hydroxyl groups, and combinations of any of the foregoing. Non-limiting examples of suitable polyether polyols include polytetrahydrofuran, polyethylene glycol, polypropylene glycol, polybutylene glycol, copolymers thereof, and combinations thereof.

Non-limiting examples of polyester polyols include those prepared from a polyol such as a polyol comprising one or more of an ether moiety and a carboxylic acid or anhydride. Suitable polyols include, for example, ethylene glycol, oligomers of ethylene glycol (including diethylene glycol, triethylene glycol and tetraethylene glycol), propylene glycol, and oligomers of propylene glycol (including dipropylene glycol, tripropylene glycol, and tetrapropylene glycol).

Other suitable polyols include, but are not limited to, 1,6-hexanediol, cyclohexanedimethanol, 2-ethyl-1,6-hexanediol, 1,4-butanediol, 1,3-propanediol, 1,4-butanediol, neopentyl glycol, dihydroxyalkylated aromatic compounds such as the bis (2-hydroxyethyl) ethers of hydroquinone and resorcinol (HER) which is also referred to as 1,3-bis(2-hydroxyethoxy) benzene, p-xylene-α,α'-diol, the bis (2-hydroxyethyl) ether of p-xylene-α,α'-diol, m-xylene-α,α'-diol and the bis (2-hydroxyethyl) ether of m-xylene-α,α'-diol, trimethylol propane, 1,2,6-hexantriol, glycerol, and combinations thereof.

Suitable carboxylic acids, which can be reacted with the polyols to form a polyester polyol include, but are not limited to, glutaric acid, succinic acid, malonic acid, oxalic acid, phthalic acid, isophthalic acid, hexahydrophthalic acid, adipic acid, maleic acid, and mixtures thereof. Another non-limiting example of a suitable carboxylic acid is a furandicarboxylic acid such as 2,5-furandicarboxylic acid, which can be reacted with an excess of polyols to form polyols containing furan-diester moieties. Anhydrides of these and any other carboxylic acid can also be used.

Furthermore, suitable carboxylic acid groups containing diols that can be used with the present invention include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines that can be used to prepare the polyurethane based polymer include aliphatic and aromatic compounds, which comprise two or more amine groups selected from primary and secondary amine groups. Examples include, but are not limited to, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, p-phenylenediamine, m-phenylenediamine, benzidine, 4,4'-methylenedianiline, 4,4'-methylenibis (2-chloroaniline), and combinations thereof.

Other non-limiting examples of suitable polyamine functional compounds include the Michael addition reaction products of a polyamine functional compound, such as a diamine, with keto and/or aldo group containing ethylenically unsaturated monomers. The polyamine functional compound typically comprises at least two primary amino groups (i.e., a functional group represented by the structural formula —NH$_2$), and the keto and/or aldo group containing ethylenically unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbon) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage for example, to form a polyurethane with pendant keto and/or aldo functional groups.

Suitable amino alcohols that can be used to prepare the polyurethane based polymer include, but are not limited to, ethanolamine, propanolamine, butanolamine, and combinations thereof.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof. Further, non-limiting examples of keto functional monoalcohols include, but are not limited to, hydroxyacetone, 4-hydroxy-2-butanone, 5-hydroxy-4-octanone, and combinations thereof. Non-limiting examples of aldo functional monoalcohols include D-lactaldehyde solution, 4-hydroxy-pentanal, 5-hydroxy-hexanal, 5-hydroxy-5-methyl-hexanal, 4-hydroxy-4-methyl-pentanal, 3-hydroxy-3-methylbutanal, and combinations thereof.

As previously described, the polymer that forms at least a portion of the polymeric shell comprises aromatic groups which have been found to increase the barrier properties of a coating formed from a coating composition of the present invention including with the core-shell particles. As used herein, the term "aromatic" refers to a cyclically conjugated moiety with a stability (due to delocalization) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof. The aromatic groups can be incorporated into the polymer through any of the previously described components used to form the polymer. For example, aromatic groups can be introduced into the backbone of the polymer with: hydroxyl containing compounds having aromatic groups such as bis(2-hydroxyethyl)ethers of hydroquinone resorcinol (HER) and diols containing furan rings; polyisocyanates having aromatic groups such as tetramethylxylylene diisocyanates or TDI; polyamines having aromatic groups such as xylylene diamines; and combinations thereof. In some examples, the polymer is a polyurethane based polymer having aromatic groups and which is prepared from a reaction mixture comprising (i) an aromatic diisocyanate and (ii) an aliphatic polyester polyol or an aliphatic polyether polyol, and (iii) optional further components such as aromatic or aliphatic polyol components including carboxyl-functional diols, and/or polyamines.

Further, the aromatic groups incorporated into the polymer that forms the polymeric shell can comprise a six-membered aromatic ring that is substituted at any position such as the ortho, meta, and/or para position. For example, the aromatic groups used to form the polymer can comprise a meta substituted six-membered aromatic ring. Non-limiting examples of meta substituted six membered aromatic rings include bis(2-hydroxyethyl)ethers of hydroquinone resorcinol (HER), tetramethylxylylene diisocyanate, and m-xylylenediamine. It is appreciated that the aromatic groups incorporated into the polymer are not limited to six-membered rings and can be selected from other membered rings including, but not limited to, five-membered aromatic rings such as furan containing compounds as previously described.

The polymer that forms at least a portion of the polymeric shell can comprise at least 10 weight %, at least 20 weight %, or at least 30 weight % of aromatic materials, based on the total solids weight of the polymer. For example, the polymer can comprise at least 10 weight %, at least 20 weight %, or at least 30 weight % of meta-substituted aromatic materials. The percent of aromatic material can be determined, for example, by adding the weight of all the monomers containing aromatic material such as a meta-substituted aromatic group, dividing that number by the total solid weight of the final resin and multiplying by 100. For example, for a polymer made from 200 g of bis(2-hydroxyethyl)ether of hydroquinone resorcinol (HER), 250 g of tetramethylxylylene diisocyanate, and 550 g of a polyether polyol, add the weights of the two aromatic monomers (200 g plus 250 g), divide by the total weight (1000 g), and multiply by 100 to obtain 45% aromatic material.

Any combination of the previously described components can be used to form the barrier segment(s) of the polymer. For example, polyols (such as 1,3-bis(2-hydroxyethoxy) benzene) can be reacted with polyisocyanates (such as TDI) to form urethane linkages and polyamines (such as m-xylylenediamine) can be reacted with polyisocyanates to form urea linkages. It is appreciated that one or more of the polyols, polyisocyanates, and/or polyamines can provide aromatic groups to the polyurethane. It is further appreciated that the polyol that contributes to the formation of the barrier segments can also provide the elastomeric segments of the final polymer. For instance, a polyol can be reacted with an isocyanate to form urethane moieties (as part of the barrier segment) while the remaining residual moiety (e.g. the polyether or polyester backbone) forms an elastomeric segment.

The barrier segment of the polymeric shell can have a glass transition temperature ($T_g$) of greater than 0° C., greater than 10° C., or greater than 20° C. The glass transition temperature ($T_g$) is determined by dynamic mechanical analysis using a model QA800 Dynamic Mechanical Analysis made by TA Instruments (New Castle, Del.) using the following parameters: mode: tension film, amplitude: 20 μm, frequency: 1 Hz, clamping force: 15 cNm, temperature cycle: −100° C. to 175° C., heating rate: 3° C./min., sample dimensions: 15.0 length×~6.5 width (mm). The peaks of the Tan Delta curves provide the Tg's of the different segments by taking in consideration the known peaks of the materials forming the barrier segments and the materials forming the elastomeric segments.

Further, the barrier segment(s) can comprise at least 30 weight % or at least 40 weight % of the polymer that forms the polymeric shell, based on the total solids weight of the polymer that forms the polymeric shell. The barrier segment(s) can also comprise up to 70 weight % or up to 60 weight % of the polymer that forms the polymeric shell, based on the total solids weight of the polymer that forms the polymeric shell. The polymer may for example comprise the barrier segment(s) in an amount of from 30 weight % to 70 weight % or from 40 weight % to 60 weight %, based on the total solids weight of the polymer that forms the polymeric shell.

As indicated, the polymer that forms the polymeric shell also includes elastomeric segment(s). The term "elastomeric segment", with respect to a polymer, refers to a section or sections on the backbone of a polymer that imparts a degree of elasticity that is higher than that of the barrier segment in the polymer and which helps provide the elastomeric properties in a coating formed from a coating composition containing the polymer such as when a coating formed from a coating composition containing the polymer is applied over a substrate. "Elastomeric" and like terms as used herein refer to materials that impart elasticity. "Elasticity" and like terms refer to the ability of a material to return to its approximate original shape or volume after the material has been deformed, such as for example stretched.

The elastomeric properties of a substrate, and/or any coatings thereon, are typically described in terms of the elongation at break. "Elongation at break" and like terms refer to the amount of elongation a substrate or coating can withstand prior to breaking or cracking. Elongation at break is determined with an INSTRON® model 4443 SFL unit with a temperature controlled test chamber (commercially available from Instron Corp.). The test rate for elongation at break measurements at −40° C. is run at 5 mm/minute and the test rate for elongation at break measurements at room temperature (i.e., 20° C. to 25° C.) is run at 50 mm/minute.

The elastomeric segment(s) of the polymer are different from the barrier segment(s). The elastomeric segment(s) can, for example, comprise ester linkages, ether linkages, sulfide linkages, natural rubber, synthetic rubber, or combinations thereof. For example, the elastomeric segment(s) of the polymer can be formed by ester linkages from a polyester, ether linkages from a polyether, sulfide linkages from a polysulfide, rubber based polymers, copolymers thereof, or combinations thereof.

Non-limiting examples of polyethers and polyesters suitable for forming the elastomeric segment(s) include any of the polyethers and polyesters previously described. Non-limiting examples of suitable polysulfides are commercially available under the trade name THIOPLAST®, a liquid polysulfide polymer, supplied by Akzo Nobel, Greiz, Germany. Other suitable polysulfides can include polysulfides described in "Sealants" by Adolfas Damusis, Reinhold Publishing Corp., 1967, at pages 175-195, which is incorporated by reference herein. Polysulfides are also described in U.S. Patent Application Publication No. 2015/0368512 at paragraphs [0025] to [0030], which is incorporated by reference herein.

Non-limiting examples of rubber based polymers include cis-1,4-polyisoprene rubber, styrene/butadiene copolymers, polybutadiene rubber, styrene/isoprene/butadiene rubber, butyl rubber, halobutyl rubber, and combinations thereof.

The elastomeric segment(s) of the polymer can have a glass transition temperature ($T_g$) of less than 0° C., less than −20° C., or less than −50° C. The glass transition temperature ($T_g$) is determined by dynamic mechanical analysis with a model QA800 Dynamic Mechanical Analysis made by TA Instruments (New Castle, Del.) as previously described.

Further, the elastomeric segment(s) can comprise at least 30 weight % or at least 40 weight % of the polymer that forms the polymeric shell, based on the total solids weight of the polymer that forms the polymeric shell. The elastomeric segment(s) can also comprise up to 70 weight % or up to 60 weight % of the polymer that forms the polymeric shell, based on the total solids weight of the polymer that forms the polymeric shell. The polymer may, for example, comprise the elastomeric segment(s) in an amount of from 30 weight % to 70 weight % or from 40 weight % to 60 weight %, based on the total solids weight of the polymer that forms the polymeric shell.

The polymer comprising barrier and elastomeric segments can be prepared by reacting any of the previously described components that form the barrier and elastomeric segments. For example, the polymer that forms the polymeric shell can be prepared by reacting a polyester or polyether polyol, other hydroxyl containing compounds such as 1,3-bis(2-hydroxyethoxy) benzene, a polyisocyanate, acid containing diols such as dimethylolpropionic acid (DMPA), a hydroxyl functional ethylenically unsaturated component, and, optionally, diamine compounds. Such polymers can have barrier segment(s) formed by aromatic groups, urethane linkages, and optionally urea linkages as well as elastomeric segment(s) formed by the ester or ether linkages.

The components that form the polymer can be reacted in a stepwise manner, or they can be reacted simultaneously. For example, the polymer can be a polyurethane formed by reacting a diisocyanate, a polyol, a carboxyl group-containing diol, and a hydroxyl group-containing ethylenically unsaturated monomer. The polyurethane can also be prepared in the presence of catalysts, polymerization inhibitors, and combinations thereof. Non-limiting examples of catalysts include triethylamine, N-ethyl morpholine, tributylamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

The polymer that forms the polymeric shell can also have a particular polymer architecture. For example, the polymer comprising barrier and elastomeric segments can have a linear random copolymer architecture or a linear block copolymer architecture. As used herein, a "random copolymer" refers to a polymer with multiple monomer units arranged in an irregular, random order. A "block copolymer"

refers to a polymer with multiple sequences, or blocks, of the same monomer alternating in series with at least another block having different monomers. The block copolymer can be a diblock copolymer (copolymer with two types of blocks), a triblock copolymer (copolymer with three types of blocks), a multiblock copolymer (copolymer with four or more types of blocks), and combinations thereof. In some examples, the polymer is a block copolymer comprising: at least one block having aromatic groups and urethane linkages, urea linkages, or a combination thereof; and at least a second different block having ester linkages, ether linkages, or a combination thereof.

Further, the polymer that forms the polymeric shell can comprise one or more, such as two or more, reactive functional groups. The term "reactive functional group" refers to an atom, group of atoms, functionality, or group having sufficient reactivity to form at least one covalent bond with another reactive group in a chemical reaction. Non-limiting examples of reactive functional groups include carboxylic acid groups, keto functional groups (also referred to as ketone functional groups), aldo functional groups (also referred to as aldehyde functional groups), amine groups, epoxide groups, hydroxyl groups, thiol groups, carbamate groups, amide groups, urea groups, isocyanate groups (including blocked isocyanate groups), ethylenically unsaturated groups, and combinations thereof. It is appreciated that the polymer comprising barrier and elastomeric segments can also be free of (i.e., does not contain) any of the previously described reactive functional groups.

As previously described, the core-shell particles of the present invention includes a polymeric core that is at least partially encapsulated by the polymeric shell. The polymeric core may for example comprise a (meth)acrylate polymer, a vinyl polymer, or a combination thereof. The polymeric core can be formed by polymerization (e.g. by emulsion polymerization) of one or more ethylenically unsaturated monomers.

The ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth)acrylic acid, and keto and aldo containing unsaturated monomers include any of those previously described. Non-limiting examples of acid group containing unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

The polymeric core can also have a glass transition temperature of less than 25° C., such as less than 20° C., less than 10° C., less than 0° C., less than −10° C., or less than −20° C., or less than −30° C., or less than −40° C. The Tg is based on the supplied/known Tg of the materials used to form the polymeric core.

After forming the polymer for the polymeric shell (such as the above identified polyurethane for example), the polymer and additional ethylenically unsaturated monomers can be subjected to a polymerization process to form the core-shell particles. The additional ethylenically unsaturated monomers can be added after forming the polymer for the polymeric shell. Alternatively, the additional ethylenically unsaturated monomers can be used as a diluent during preparation of the polymer and not added after formation of the polymer. It is appreciated that ethylenically unsaturated monomers can be used as a diluent during preparation of the polymer and also added after formation of the polymer. The polymerization can be conducted using art recognized techniques as well as conventional additives such as emulsifiers, protective colloids, free radical initiators, and chain transfer agents known in the art.

It is appreciated that the polymeric core can include any of the previously described reactive functional groups with respect to the polymeric shell. Alternatively, the polymeric core can be free of any or all of the previously described reactive functional groups. Further, the polymeric core and polymeric shell of the core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. For example, the polymeric shell can comprise carboxylic acid functional groups that can be at least partially neutralized (i.e., at least 30 percent of the total neutralization equivalent) by an inorganic base, such as a volatile amine, to form a salt group as previously described, while the hydrophobic polymeric core can be free of carboxylic acid groups and salt groups formed therefrom. Examples of suitable amines are ammonia, dimethylamine, trimethylamine, monoethanolamine, and dimethylethanolamine. It is appreciated that the amines will evaporate during the formation of the coating to expose the carboxylic acid functional groups and allow the carboxylic acid functional groups to undergo further reactions such as with a crosslinking agent reactive with the carboxylic acid functional groups. Other non-limiting examples of water-dispersible groups include polyoxyalkylene groups. The hydrophilic water-dispersible groups can increase the water-dispersibility/stability of the polymeric shell in the aqueous medium so that the polymeric shell at least partially encapsulates the hydrophobic core.

In some examples, the polymeric core comprises a (meth)acrylate polymer and the polymeric shell comprises a polyurethane with pendant and/or terminal carboxylic acid functional groups and, optionally, other reactive functional groups such as hydroxyl groups. A "pendant group" refers to a side group that is an offshoot from the side of the polymer backbone and which is not part of the polymer backbone. In contrast, a "terminal group" refers to a group on an end of the polymer backbone and which is part of the polymer backbone.

The polymeric shell can also be covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

In some examples, the core-shell particles of the present invention are prepared with: (i) ethylenically unsaturated monomers; (ii) polyurethane prepolymers comprising isocyanate functional groups, aromatic groups, carboxylic acid functional groups, ethylenically unsaturated groups, and, optionally hydroxyl functional groups; and (iii) optionally, a diamine that may or may not include aromatic groups. The resulting core-shell particles comprise a polymeric core prepared from ethylenically unsaturated monomers that is covalently bonded to at least a portion of a polyurethane shell having pendant carboxylic acid functional groups, urethane linkages, aromatic groups, and, optionally, urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described.

The core-shell particles can also be prepared such that the shell comprises at least 75 weight % of the core-shell particles, based on the total solids weight of the core-shell particle. In some examples, the core-shell particles are prepared such that the shell comprises at least 80 weight % of the core-shell particles. or at least 85 weight % of the core-shell particles, or least 90 weight % of the core-shell particles, based on the total solids weight of the core-shell particle.

As indicated, the polymeric core-shell particles are dispersed in an aqueous carrier medium of the coating composition according to the present invention. It is appreciated that any combination of core-shell particles described herein can be dispersed in an aqueous medium to form a latex. As used herein, a "latex", with respect to the core-shell particles, refers to an aqueous colloidal dispersion of the polymeric particles.

The core-shell particles can comprise at least 40 weight %, such as at least 50 weight %, or at least 60 weight % of the coating composition, based on the total solids weight of the coating composition of the present invention. The core-shell particles can comprise up to 90 weight %, such as up to 80 weight %, or up to 75 weight % of the coating composition according to the present invention, based on the total solids weight of the coating composition. For example, the coating composition of the present invention can comprise the core-shell particles in an amount of from 40 to 90 weight %, or from 50 to 80 weight %, or from 60 to 75 weight % of the coating composition, based on the total solids weight of the coating composition.

It was found that the addition of the core-shell particles to the coating composition provide good elastomeric and barrier properties. For example, the core-shell particles improved the elongation at break of the final coating at low temperatures such as at −40° C. while maintaining good barrier properties.

As previously described, the coating composition, according to the present invention, also includes an elastomeric polymer(s) that can further increase elasticity of the final coating. Non-limiting examples of elastomeric polymers include polyesters, polyethers, polysulfides, natural rubbers, synthetic rubbers, copolymers thereof, or combinations thereof. Examples of suitable polyesters, polyethers, polysulfides and rubber based polymers include, but are not limited to, any of those previously described. Other non-limiting examples of elastomeric polymers are described in U.S. Pat. No. 8,716,402 at column 4, line 34 to column 5, line 2, which is incorporated by reference herein.

The elastomeric polymer(s) can be dispersed in an aqueous medium to form a separate dispersion before being combined with the other components of the coating composition. The polymer dispersion can then be combined with other components to form the coating composition of the present invention. The elastomeric polymer(s) can also be dispersed with the core-shell particles and then combined with other components to form the coating composition of the present invention.

The elastomeric polymer(s) can comprise at least 1 weight %, such as at least 5 weight %, or at least 8% of the coating composition, based on the total solids weight of the coating composition. The elastomeric polymer(s) can comprise up to 50 weight %, such as up to 340 weight %, up to 30 weight %, or up to 20 weight % of the coating composition, based on the total solids weight of the coating composition. The coating composition can, for example, comprise the elastomeric polymer(s) in an amount, from 1 to 50 weight %, such as from 5 to 30 weight %, or from 5 to 20 weight %, based on the total solids weight of the coating composition.

The core-shell particles and elastomeric polymers that form the coating composition can have functional groups that are reactive with each other or with themselves such that the polymers are self-crosslinking. The coating composition can, optionally, also include a crosslinker. As used herein, a "crosslinker" refers to a chemical species comprising two or more functional groups that are reactive with other functional groups and which is capable of linking two or more monomers or polymer molecules through covalent bonds. Non-limiting examples of crosslinkers that can be used with the compositions described herein include carbodiimides, polyhydrazides, aziridines, epoxy resins, alkylated carbamate resins, (meth)acrylates, isocyanates, blocked isocyanates, polyacids, polyamines, polyamides, aminoplasts (such as melamine formaldehyde condensation products), melamines, hydroxyalkyl ureas, hydroxyalkyl amides, and any combination thereof. It is appreciated that the coating composition can include a single type or multiple types of crosslinkers.

The crosslinkers used with the elastic barrier compositions described herein can be reactive with the core-shell particles, the elastomeric polymers, or any combination thereof. For example, the coating compositions of the present invention can comprise a carbodiimide reactive with the core-shell particles, the elastomeric polymers, or any combination thereof. Non-limiting examples of suitable carbodiimides are described in U.S. Patent No. 2011/0070374, which is incorporated by reference herein in its entirety.

In some examples, the coating composition comprises carboxylic acid functional core-shell particles and/or carboxylic acid functional elastomeric polymers, and a carbodiimide crosslinker that is reactive with the carboxylic acid functional groups. As indicated, the coating composition can comprise two or more different crosslinkers that are reactive with different functional groups. Thus, the coating composition of the present invention can for example comprise a polyhydrazide crosslinker reactive with keto and/or aldo functional groups or another crosslinker reactive with hydroxyl functional groups as well as a carbodiimide crosslinker reactive with carboxylic acid functional groups.

The coating composition can also comprise a first crosslinker(s) selected from a polyhydrazide, a carbodiimide, or a combination thereof, and a secondary crosslinker(s) that is different from the first crosslinker(s) and which can be used to help maintain the desired properties of the final coatings. For example, the secondary crosslinker(s) can be added to stop the softening of the final coating at high temperatures (e.g. above 100° C.). Non-limiting examples of suitable secondary crosslinker(s) include melamines, hydroxyalkyl ureas, hydroxyalkyl amides, blocked isocyanates, and combinations thereof. The secondary crosslinker(s) can be reactive with the core-shell particles, the elastomeric polymer(s), or any combination thereof.

The crosslinker(s) can comprise at least 1 weight %, such as at least 2 weight %, or at least 3 weight % of the coating composition, based on the total solids weight of the coating composition. The crosslinker(s) can comprise up to 10 weight %, up to 8 weight %, or up to 5 weight % of the coating composition, based on the total solids weight of the coating composition. The coating composition of the present invention can, for example, comprise the crosslinker(s) in a total amount of from 1 to 10 weight %, or from 2 to 8 weight %, or from 3 to 8 weight % of the coating composition, based on the total solids weight of the coating composition. If used, secondary crosslinker(s) as set forth above can be included in the coating composition of the present invention at a lower amount than the first crosslinker(s).

The coating compositions can also include a platy inorganic filler. As used herein, a "platy inorganic filler" refers to an inorganic material in a platy form. The term "platy" refers to a structure in which one dimension is substantially smaller than the two other dimensions of the structure resulting in a flat type appearance. The platy inorganic fillers are generally in the form of stacked lamellae, sheets, platelets, flakes, or plates with a relatively pronounced anisometry. The platy inorganic filler(s) can further improve the barrier performance of the resulting coating by reducing the permeability of liquids and gases.

Suitable platy inorganic fillers can include those having a high aspect ratio, such as for example, vermiculite, mica, talc, wollastonite, chlorite, metal flakes, platy clays, and platy silicas. Such fillers typically have diameters of 1 to 20 µm (microns), 2 to 5 µm (microns), or 2 to 10 µm (microns). The aspect ratio of the fillers can be at least 5:1, such as at least 10:1 or 20:1. For example, mica flakes may have an aspect ratio of 20:1 or more, talc may have an aspect ratio of 10:1 to 20:1, and vermiculite may have an aspect ratio of from 200:1 to 10,000:1.

The coating compositions of the present invention can optionally include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketopyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of optional materials that can be used with the coating compositions of the present invention include plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

The coating compositions of the present invention can be prepared by mixing the core-shell particles and elastomeric polymers described above and, optionally, one or more crosslinker(s) and any of the other previously described components in an aqueous carrier medium. As previously described, the core-shell particles and elastomeric polymers can be formed as separate dispersions. As such, the previously described polymers and core-shell particles can first be prepared as separate dispersions and then combined along with the other optional components to form the coating composition. Alternatively, two or more of the previously described components can be dispersed together in the same aqueous medium before being combined with the remaining components of the coating composition.

After forming the coating compositions of the present invention, the compositions can be applied to a wide range of substrates known in the coatings industry. Non-limiting examples of suitable substrates include automotive substrates, industrial substrates, packaging substrates, aerocraft and aerocraft components, marine substrates and components such as ships, vessels, and on-shore and off-shore installations, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric substrates such as polyester, polyolefin, polyamide, cellulosic, polystyrene, polyacrylic, poly(ethylene naphthalate), polypropylene, polyethylene, nylon, EVOH, polylactic acid, and other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, ceramic, glass, paper, cardboard, textiles, leather both synthetic and natural, and the like or combinations or composites of any of the foregoing.

Specific non-limiting examples of suitable substrates include athletic balls, such as soccer balls, basketballs, volleyballs, footballs, racquet balls, squash balls, beach balls, tennis balls, golf balls, baseballs, and the like; inflatable rafts, furniture, toys, and the like; air mattresses, air bags, air shocks, bladders, emergency slides, life vests, medical equipment and devices, such as blood pressure bags, catheters, and the like; tires, such as bike tires, automobile tires, bike tubes, ultra-terrain bike tires, motorcycle tires, lawn tractor tires, and the like; balloons, air bladders, or other footwear applications, packaging material, such as bottles, wraps, food, or plastic sheets, hoses, garbage bags, plastic light bulbs, fire extinguishers, LED displays, plasma TV's, parachutes, scuba tanks, gas cylinders, flexible foam, rigid foam, other pipes, hoses, tubes, and the like; architectural needs, such as windows, roofing, siding, and the like; fiber optic cables, seals and gaskets, batteries, clothing and other textiles, swimming pool liners and covers, hot tubs, tanks, electronics, buckets, and pails.

The coating compositions of the present invention are particularly useful when applied to elastomeric substrates that exhibit a degree of elasticity. Examples of such substrates include, but are not limited, thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles, natural textiles, rubbers, and combinations thereof. The substrates can also include those that have gas permeability such as substrates comprising polymers, including but not limited to, polyesters, polyolefins, polyamides, cellulosics, polystyrenes, polyacrylics, polycarbonates, poly(ethylene terephthalate), poly(ethylene naphthalate), and combinations thereof. It is appreciated that the substrates can include gas permeable elastomeric materials.

It was found that the coating compositions of the present invention can be applied to a substrate and cured to form elastic gas barrier coatings that provide both low temperature elasticity and good oxygen/nitrogen gas barrier performance. For example, coatings deposited from the coating compositions described herein have been found to exhibit an elongation at break of at least 25% at −40° C., at least 50% at −40° C., at least 75% at −40° C., or at least 100% at −40° C. The coatings also exhibit an elongation at break of at least 100% at temperatures around room temperature (20° C. to 25° C.) and higher. In addition, the elastic gas barrier coatings also exhibit good oxygen permeance at temperatures from −40° C. to 100° C., such as an oxygen permeance of 100 or less cc·mm/m$^2$·day·atm, 80 or less cc·mm/m$^2$·day·atm, 60 or less cc·mm/m$^2$·day·atm, 50 or less cc·mm/m$^2$·day·atm, or 40 or less cc·mm/m$^2$·day·atm at 23° C. and 50% relative humidity.

The elongation at break is determined with an INSTRON® model 4443 SFL unit with a temperature controlled test chamber (commercially available from Instron Corp.). Further, the oxygen permeance is determined with an OX-TRAN® 1/50 test system (commercially available from Mocon Inc.) at 23° C. and 50% relative humidity in accordance with ASTM method F1927-14.

To increase adhesion of a coating to a substrate, the substrate can be chemically and/or mechanically treated prior to applying a coating composition or film described herein. For instance, the surface of the substrate can be roughened, treated with steam, treated with a chemical solution, or heated prior to applying a coating composition or film. Any combination of these treatment methods can be used together to improve adhesion of a coating to the substrate.

The process of roughening the surface of a substrate can comprise abrading or scuffing the surface of the substrate such that the texture of the surface is adjusted to include increased or additional vertical deviations. The surface of the substrate can be roughened using various methods including, but not limited to, sandblasting, scrubbing with sandpaper, or a combination thereof. As used herein, "sandblasting" refers to a process of spraying sand, or fine particles of other materials such as gravel, over the surface of a substrate. Sandblasting can use compressed-air to spray the sand or other fine particulate materials at a pressure and speed sufficient to roughen the surface of the substrate.

As indicated, the surface of the substrate can also be treated with steam and/or a chemical solution. As used herein, "steam" refers to a vapor or mist formed from water, and a "chemical solution" refers to a liquid mixture of two or more substances. Non-limiting examples of chemical solutions that can be used to treat the surface of the substrate include solutions comprising chlorinated compounds. Examples of suitable chlorinated compounds include, but are not limited to, hypochlorite, trichloroisocyanuric acid, and combinations thereof. A commercially available chemical solution includes Clorox Clean-Up® from the Clorox Company. The steam and/or chemical solution can be applied to the surface of the substrate to remove contaminates and other objects.

Further, the substrate or the surface of the substrate that is to be coated can be heated to further increase adhesion of a coating. For example, the substrate or surface of the substrate can be heated to a temperature of 100° C. to 300° C., or from 120° C. to 280° C., or from 150° C. to 250° C. The substrate or surface of the substrate can be heated with convective heat, electromagnetic radiation such as infrared radiation, or a combination thereof. "Convective heat" refers to a heat transfer in a gas, and "electromagnetic radiation" refers to radiant energy released by electromagnetic processes. Electromagnetic radiation includes radio waves, microwaves, infrared and near-infrared radiation, visible light, and ultraviolet radiation.

As noted above, the surface of a substrate can be treated with any combination of the previously described treatment methods. For instance, the surface of a substrate can be sandblasted, treated with steam and a hypochlorite chemical solution, and then heated to a temperature of 100° C. to 300° C. prior to applying a coating composition.

The coating compositions of the present invention can be applied to the substrate by various means known in the art including, but not limited to, spraying, dipping, brushing, rolling, and the like. Further, the coating compositions can be applied to a substrate using various devices. For instance, when applied to the inner liner of a tire, the coating compositions can be spray applied using devices that secure and rotate the tire during application.

In some examples, referring to FIG. 1, the coating composition is spray applied to the inner portion of a tire 12, such as an inner liner of tire 12, using a device 10 that secures and rotates the tire 12 in a vertical position during application. The device 10 includes a rotator frame 14 and a motor 16, such as an electric motor, that is mounted on the rotator frame 14. One or more drive rollers 18 and free spinning rollers 20 are further attached to the rotator frame 14. It is appreciated that the number of drive rollers 18 and free spinning rollers 20 can be selected based on the size of the tire 12 in order to support and rotate the tire 12.

Figure 2:
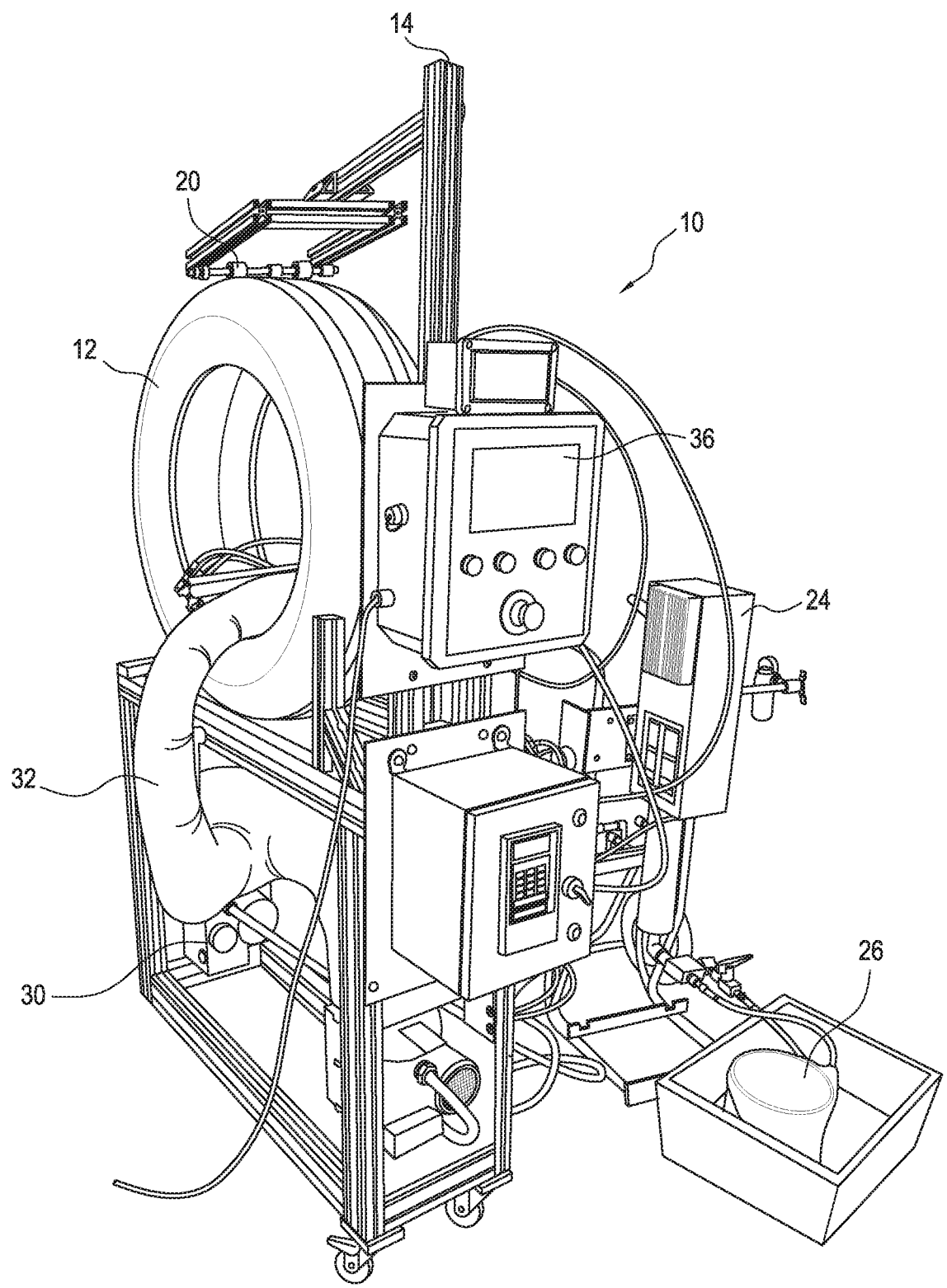
FIG. 2 is a second perspective view of the device shown in FIG. 1.

Referring to FIGS. 1 and 2, the tire 12 is placed in a vertical position onto the rotator frame 14 such that the drive rollers 18 and free spinning rollers 20 contact the outside and/or inside of the tire 12. The drive rollers 18 and free spinning rollers 20 can be positioned on various areas of the tire 12. For instance, and as shown in FIG. 1, the drive rollers 18 and free spinning rollers 20 can be mounted to the rotator frame 14 such that the drive rollers 18 and free spinning rollers 20 contact the bottom outside portion of the tire 12. In addition, and as shown in FIG. 2, free spinning rollers 20 can be mounted to the rotator frame 14 such that free spinning rollers 20 contact the top outside portion of the tire 12. It was found that free spinning rollers 20 in contact with the top outside portion of the tire 12 provide a downward force onto the tire that eliminates tire 12 bounce during rotation of the tire 12.

Figure 3:
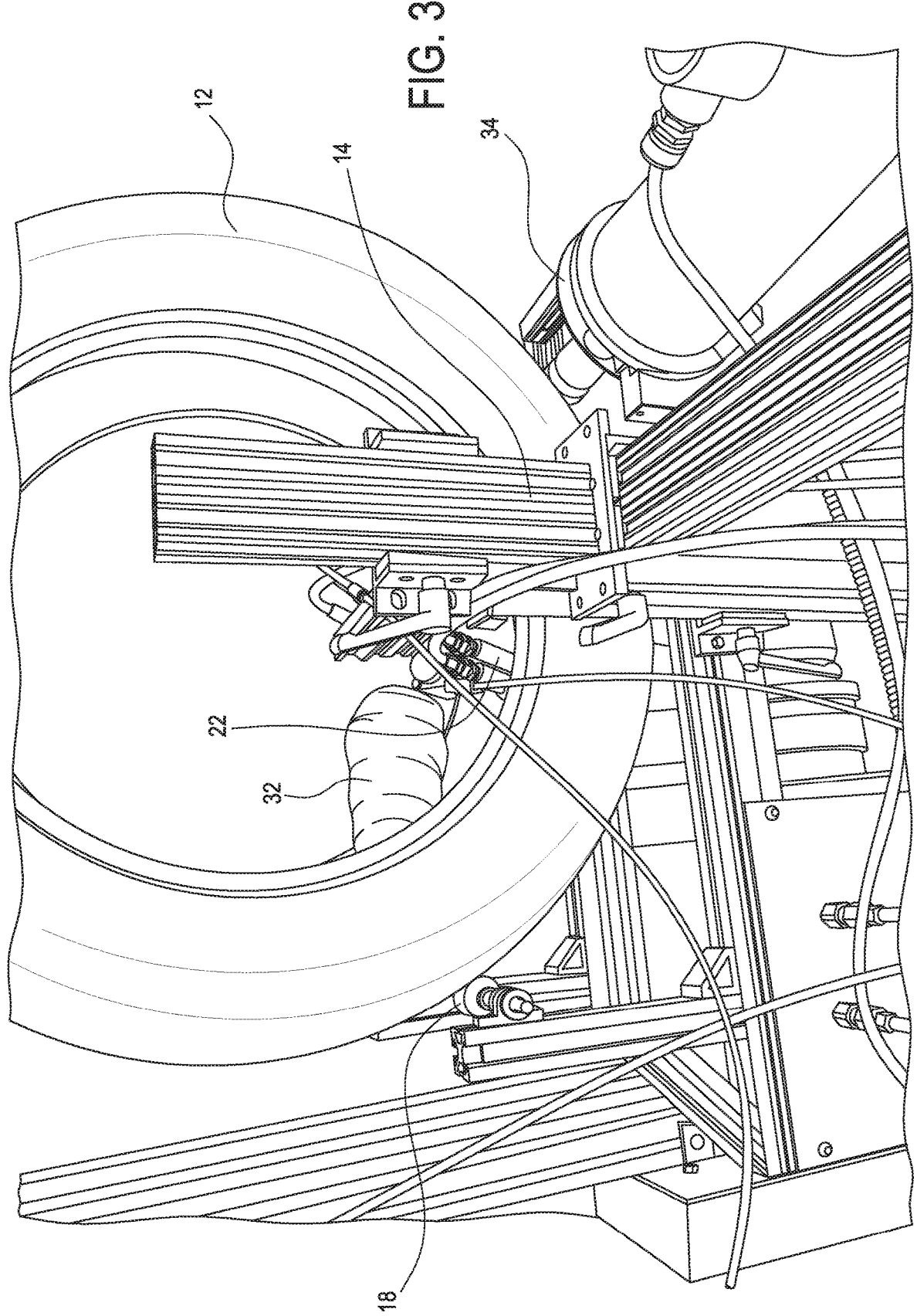
FIG. 3 is an expanded view of a portion of the device shown in FIG. 1.

Referring again to FIGS. 3 and 4, the device 10 further includes spray guns 22 including, but not limited to, airless spray guns 22. The spray guns 22 are mounted to the rotator frame 14 and can be adjusted to different positions to dispense the coating compositions of the present invention onto an inside or interior of the tire 12 such as the inner liner of the tire 12. The spray guns 22 can be adjusted to achieve uniform coating coverage over the interior of the tire 12. Further, the nozzles of each spray gun 22 can be sized to help achieve the desired coating coverage.

As shown in FIGS. 1 and 2, the previously described spray guns 22 are coupled to a high pressure pump 24 to deliver the coating compositions of the present invention from a reservoir or container 26 to the spray guns 22. When the spray guns 22 are not in operation, the coating composition is recirculated back to the pump 24 under high pressure. Each high pressure pump 24 can be connected to a spray gun 22 with a high pressure fluid line. As further shown in FIG. 1, a high pressure regulator 28 can be used to set the coating pressure during application of the coating composition.

Figure 4:
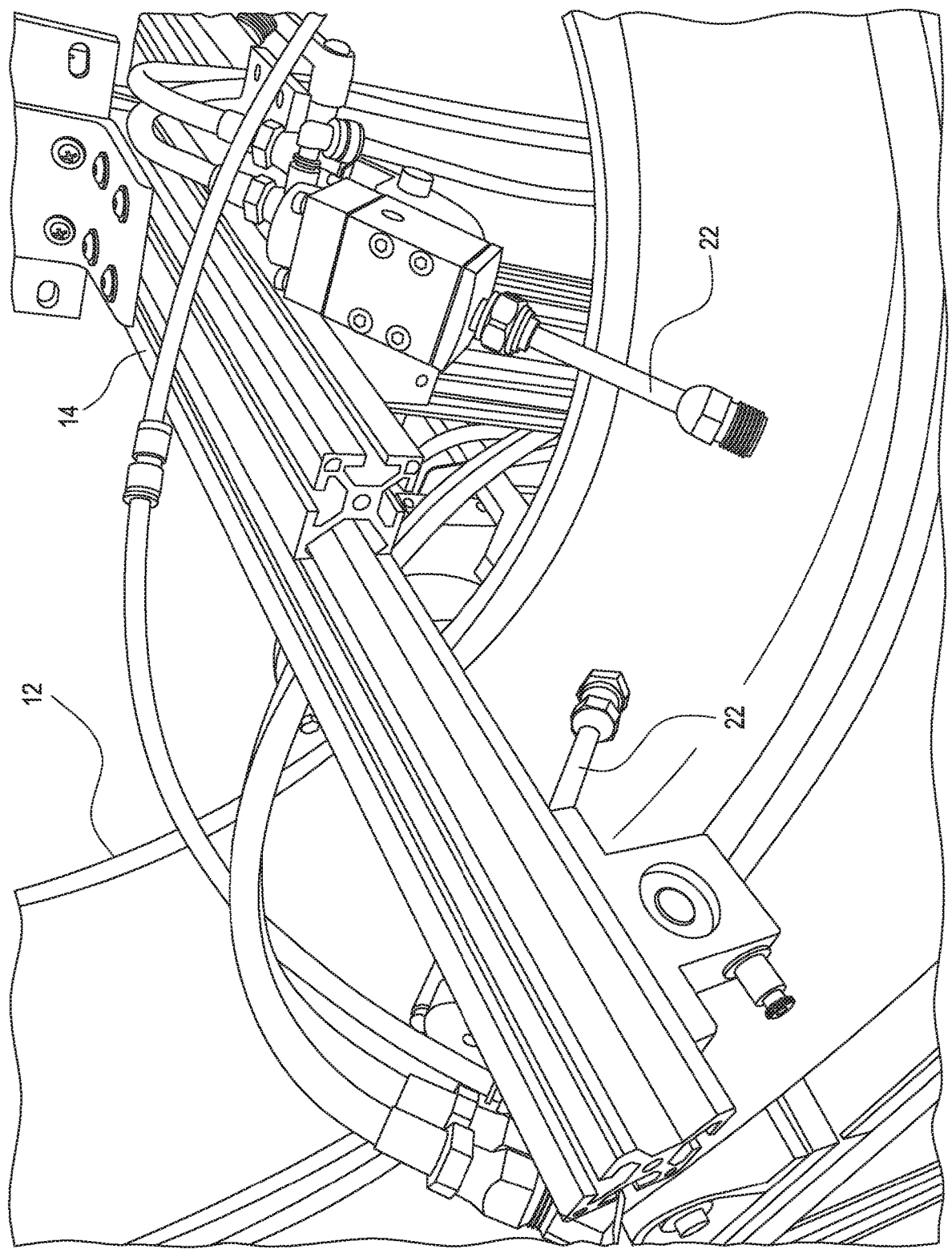
FIG. 4 is a second expanded view of a portion of the device shown in FIG. 1.

Referring to FIG. 4, the device 10 can further comprise an air blower/heater 30 that produces heated air and which can be applied to the tire 12 with a duct or other conduit 32 prior to, during, and/or after application of the coating composition. The temperature and air flow rate of the heated air can be selected to achieve optimal drying of the coating applied over the tire 12.

The device 10 can further include other components including, but not limited to, a gear and sensor 34 that can provide motor speed feedback to help control the rotational speed of the tire 12 (see FIG. 4). A control system 36, as shown in FIGS. 1 and 2, can also be used to control the various components of the device 10. For instance, the device 10 can comprise a control system 36 that controls the spray guns 22/coating flow rate, air blower/heater 30, rotational speed of the tire 12, and the number coatings applied to the tire 12. The control system 36 can comprise one or more microprocessors, CPUs, and/or other computing devices.

During operation, the control system 36 can cause the tire 12 to rotate along the vertical position. As the tire 12 is rotating, the control system 36 will trigger the spray guns 22 to apply the coating compositions of the present invention to the interior of the tire 12 while heated air from the air blower/heater 30 is blown into the interior of the tire 12. It is appreciated that the rotational speed of the tire 12, the coating flow rate, and the number of coats applied will determine the final coating thickness. As such, the control system 36 can be configured to provide a desired coating thickness by controlling the rotational speed of the tire 12, the coating flow rate, and the number of coats applied.

Figure 5:
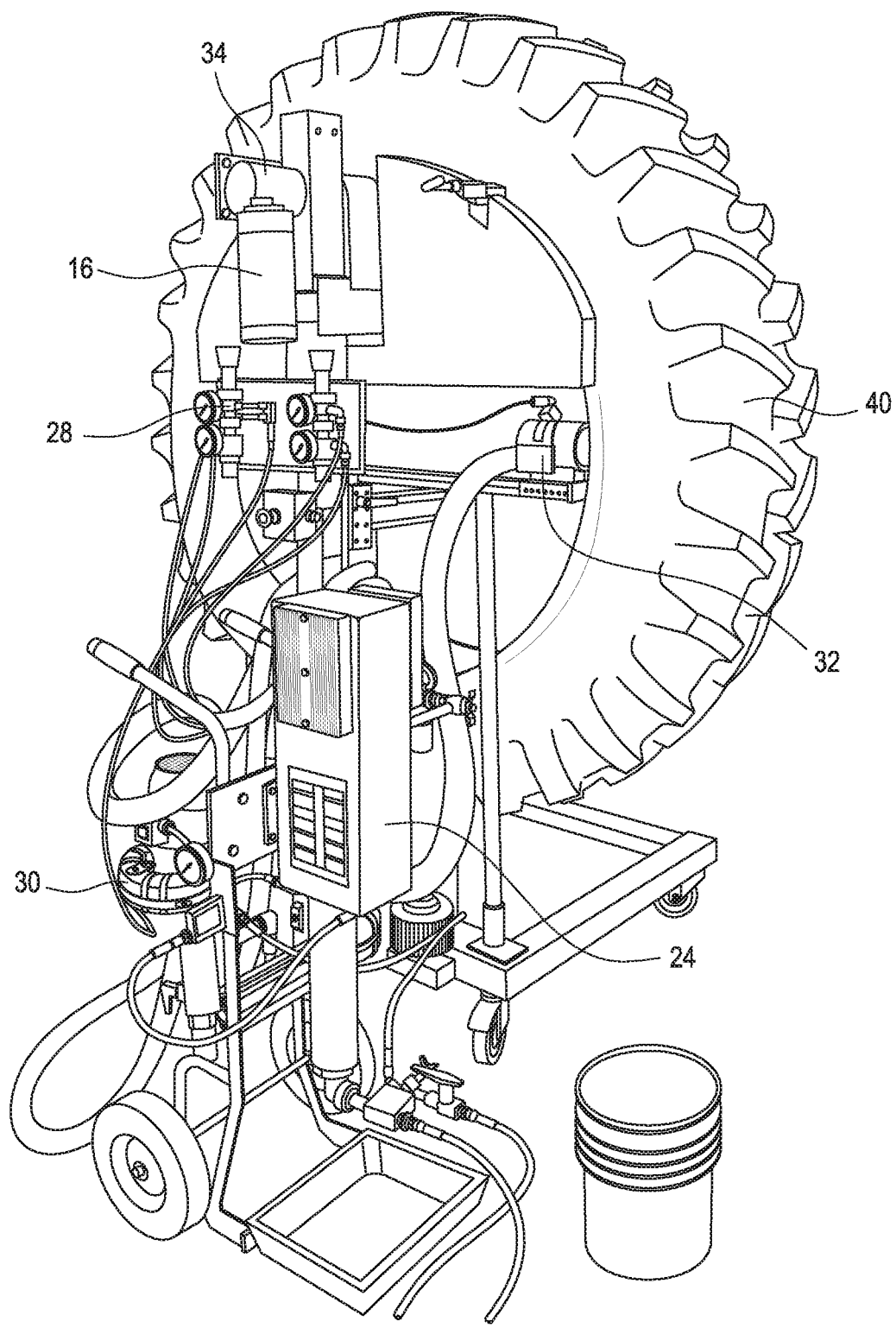
FIG. 5 is a perspective view of a device for spraying a coating composition to a tractor tire according to the present invention.

The above device 10 can be used to apply the coating compositions of the present invention to various types of tires 12 such as a passenger tire 12 for example. The device 10 can also be modified to apply the coating compositions of the present invention to other tires such as a tractor tire 40 as shown in FIG. 5. For example, the drive rollers 18 and free spinning rollers 20 can be positioned on a cover formed along the interior of the 40 such that the drive rollers 18 and free spinning rollers 20 contact an inside portion of the tire 12.

After the coating compositions are applied to a substrate, the compositions can be dried and/or cured at ambient conditions, with heat, or with other means such as actinic radiation to form a coating. As used herein, the terms "curable", "cure", and the like mean that at least a portion of the resinous materials in a composition is crosslinked or crosslinkable. Further, "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-rays, and gamma radiation.

The coating composition of the present invention can also be at least partially applied to an elastomeric substrate and co-molded or covulcanized therewith. "Covulcanization" and like terms refer to the process of chemically producing crosslinks or bonds between the elastomeric materials in the coating composition and the substrate. When a crosslinker is used with the coating composition, it will be appreciated that two "crosslinking" mechanisms occur—one between the elastomeric materials in the coating composition and the substrate, and one between the functional groups on the polymeric materials and the crosslinker(s) used in the coating composition.

In addition, the coating composition can also be applied to a substrate as a dehydrated film and then formed into the final coating. For example, the coating composition of the present invention can be applied to a first substrate and then dried such that substantially all water in the coating composition is evaporated to thereby form an elastic barrier film. The first substrate can include any of those previously described provided that the dehydrated film does not form bonds with the substrate. The coating composition can also be applied to the first substrate using any technique known in the art such as spraying for example.

As indicated, substantially all water in the coating composition is removed after being applied to the first substrate. As used herein, "substantially all water" refers to at least 90% of all water in the coating composition. The water can be evaporated at ambient conditions or by applying heat. In some examples, substantially all water from the coating composition is evaporated by heating the coating composition at temperature of 25° C. to 150° C.

After forming an elastic barrier film by evaporating substantially all water from the coating composition, the film can be removed from the first substrate and applied to a second substrate. The second substrate can include any of the substrates previously described. The elastic barrier film may then be cured and/or further dried to form the final coating over the substrate. The film can be cured and/or dried by: (i) applying actinic radiation to the applied film; (ii) applying convective heat to the applied film; (iii) applying the elastic barrier film to the second substrate while the second substrate is heated above ambient temperatures; or a combination thereof.

Alternatively, the film is cured and/or dried by maintaining the film on the second substrate at ambient conditions for a time sufficient to allow the curing and/or drying of the elastic barrier film. As used herein, a "time sufficient", with respect to the curing and/or drying of the elastic barrier film, refers to a period of time necessary to remove any remaining solvents and form the final coating such as with a crosslinking process.

It was found that the formation and application of a preformed film provides a more continuous coating over the final substrate. The elastic barrier film also allows for easy storage, transportation, and application of the film prior to formation of the final coating.

The coating formed over the final substrate according to any of the methods previously described will typically have a dry film thickness of 2.54 μm to 2.03 mm (0.1 to 80 mils), such as 12.7 μm to 1.27 mm (0.5 to 50 mils) or 0.25 mm to 0.76 mm (10 to 30 mils).

The coating compositions described herein can be applied to a substrate to form a monocoat. As used herein, a "monocoat" refers to a single layer coating system that is free of additional coating layers. Thus, the coating composition can be applied directly to a substrate and dehydrated and/or cured to form a single layer coating, i.e. a monocoat.

Alternatively, the coating compositions can be applied to a substrate along with additional coating layers to form a multi-layer coating. For example, the elastic barrier coatings described herein can be applied directly over a substrate or over a primer layer as a basecoat layer and additional coating layers can be applied over the basecoat as a topcoat. The elastic barrier coatings can also be applied over a basecoat as a topcoat. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact. A "topcoat" refers to the uppermost layer of a multi-layer system that includes that can provide a protective and/or decorative layer.

Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

The present invention is also directed to the following clauses.

Clause 1: An elastic barrier coating composition comprising: (a) an aqueous dispersion of core-shell particles, the core-shell particles comprising a polymeric core at least partially encapsulated by a polymeric shell, wherein the polymeric shell comprises: (i) a barrier segment comprising aromatic groups and urethane linkages, urea linkages, or a combination thereof; and (ii) an elastomeric segment that is different from (i), the barrier segment comprises at least 30 weight % of the polymeric shell based on the total solids weight of the polymeric shell, and wherein the polymeric shell is covalently bonded to at least a portion of the polymeric core; and (b) an elastomeric polymer that is different from (a).

Clause 2: The elastic barrier coating composition of clause 1, wherein the polymeric core has a glass transition temperature of less than 25° C.

Clause 3: The elastic barrier coating composition of clauses 1 or 2, wherein the polymeric core comprises a (meth)acrylate polymer, a vinyl polymer, or a combination thereof.

Clause 4: The elastic barrier coating composition of any of clauses 1 to 3, wherein the polymeric shell of the core-shell particles comprises hydroxyl functional groups, carboxylic acid functional groups, or combinations thereof.

Clause 5: The elastic barrier coating composition of any of clauses 1 to 4, wherein the elastomeric segment of the core-shell particles has a glass transition temperature of less than −20° C.

Clause 6: The elastic barrier coating composition of any of clauses 1 to 5, wherein the elastomeric segment of the core-shell particles comprises ester linkages, ether linkages, sulfide linkages, natural rubber, synthetic rubber, or combinations thereof.

Clause 7: The elastic barrier coating composition of any of clauses 1 to 6, wherein the barrier segment of the core-shell particles has a glass transition temperature of greater than 0° C.

Clause 8: The elastic barrier coating composition of any of clauses 1 to 7, wherein the polymeric shell comprises at least 75 weight % of the core-shell particles, based on the total solids weight of the core-shell particles.

Clause 9: The elastic barrier coating composition of any of clauses 1 to 8, wherein the core-shell particles are obtained from a mixture of reactants comprising: (i) a polymer comprising an ethylenically unsaturated group, aromatic groups, and urethane linkages, urea linkages, or a combination thereof; and (ii) ethylenically unsaturated monomers.

Clause 10: The elastic barrier coating composition of any of clauses 1 to 9, wherein the elastomeric polymer of (b) has a glass transition temperature of less than 0° C.

Clause 11: The elastic barrier coating composition of any of clauses 1 to 10, wherein the elastomeric polymer of (b) comprises a polyester, a polyether, a polysulfide, natural rubber, synthetic rubber, copolymers thereof, or combinations thereof.

Clause 12: The elastic barrier coating composition of any of clauses 1 to 11, further comprising a crosslinker reactive with at least the core-shell particles.

Clause 13: The elastic barrier coating composition of clause 12, wherein the crosslinker comprises a carbodiimide.

Clause 14: The elastic barrier coating composition of clauses 12 or 13, further comprising at least two different crosslinkers, and wherein at least one of the crosslinkers is reactive with at least the core-shell particles.

Clause 15: The elastic barrier coating composition of any of clauses 12 to 14, wherein a first crosslinker comprises a carbodiimide and a second crosslinker comprises an aminoplast, a hydroxyalkyl urea, a hydroxyalkyl amide, a blocked isocyanate, or a combination thereof.

Clause 16: A substrate at least partially coated with a coating formed from the elastic barrier coating composition of any of clauses 1 to 15.

Clause 17: The substrate of clause 16, wherein the substrate comprises an elastomeric substrate.

Clause 18: The substrate of clauses 16 or 17, wherein the substrate is a tire.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

Further, various measurements in the Examples were determined as follows. Brookfield viscosities were measured at 25° C. on a Brookfield Viscometer DV-II+Pro using spindle #2 at 60 RPM. Acid values and hydroxyl values were determined using a Metrohm 798 MPT Titrino automatic titrator according to ASTM D 4662-15 and ASTM E 1899-16. Non-volatile contents were measured by comparing initial sample weights to sample weights after exposure to 110° C. for 1 hour.

Moreover, weight and number average molecular weight of polymeric samples were measured by gel permeation chromatography relative to linear polystyrene standards of 800 to 900,000 Da. Gel permeation chromatography was performed using a Waters 2695 separation module with a Waters 2414 differential refractometer (RI detector). Tetrahydrofuran (THF) was used as the eluent at a flow rate of 1 ml min−1. Two PLgel Mixed-C (300×7.5 mm) columns were used for separation.

Example 1

Preparation of a Polyester Prepolymer

A polyester prepolymer was prepared from the components listed in Table 1.

TABLE 1

| Component | Amount (grams) |
| --- | --- |
| Diethylene glycol | 1140.9 |
| Succinic anhydride | 1128.0 |
| Butyl stannoic acid | 10.63 |

The components listed in Table 1 were charged in a four-neck round bottom flask equipped with an electronic temperature probe, mechanical stirrer, condenser, dry nitrogen sparge, and a heating mantle. The temperature was gradually increased to 210° C. over an eight hour period while stirring, sparging with nitrogen, and collecting the distillate. The reaction temperature was then held at 210° C. for 10 hours until the acid value dropped to 3.1 and 335 ml of distillate was collected. The final product was a dark orange liquid with a Gardner-Holdt viscosity of Z6+, a hydroxyl value of 72.6, a number average molecular weight ($M_N$) of 1636 g/mol, a weight average molecular weight ($M_W$) of 4127 g/mol, and a nonvolatile content of 98.4%.

Example 2

Preparation of a Polyester Polyurethane Dispersion

A polyester polyurethane dispersion was prepared from the components listed in Table 2.

TABLE 2

| Component | Amount (grams) |
| --- | --- |
| Charge A | |
| Polyester prepolymer of Example 1 | 1339.7 |
| Dimethylolpropionic acid | 201.0 |
| Hydroxyethyl methacrylate | 36.3 |
| 1,3-bis(2-hydroxyethoxy) benzene | 502.4 |
| Butylated hydroxytoluene | 3.35 |

TABLE 2-continued

| Component | Amount (grams) |
|---|---|
| Charge B | |
| Butyl acrylate | 807.9 |
| Ethylene glycol dimethacrylate | 12.6 |
| Charge C | |
| Toluene diisocyanate | 1157.2 |
| Charge D | |
| Butyl acrylate | 115.7 |
| Charge E | |
| Water | 4395.7 |
| Dimethylethanolamine | 98.3 |
| Ethylenediamine | 76.2 |
| Diethanolamine | 27.0 |
| FOAMASTER ® MO 2111[1] | 7.70 |
| Charge F | |
| Water | 77.1 |
| t-Butyl hydroperoxide | 3.85 |
| Charge G | |
| Water | 533.4 |
| Ferrous ammonium sulfate | 0.039 |
| Sodium metabisulfite | 3.42 |
| Dimethylethanolamine | 2.4 |
| Charge H | |
| Water | 15.9 |
| PROXEL ® GXL[2] | 8.0 |

[1]A defoamer, commercially available from BASF Corporation.
[2]A preservative, commercially available from Arch Chemicals.

Charge A was added to a four-neck round bottom flask equipped with an electronic temperature probe, mechanical stirrer, condenser, nitrogen atmosphere, and a heating mantle. Charge A was stirred at 110° C. for 30 minutes then cooled to 35° C. Charge B was then added and the mixture was adjusted to 91° C. One third of charge C was added over 30 minutes and the mixture was cooled to 40° C. The remainder of Charge C was then added over twenty minutes. Charge D was used to rinse the addition funnel used for charge C. The reaction mixture was held at 85° C. for 90 minutes.

Charge E was heated in a separate 12 liter four-neck flask under a nitrogen atmosphere to 50° C. Next, 3,751 g of the reaction product of charges A, B, C, and D were added to charge E over a 20 minute period. The mixture was cooled to 45° C. and a nitrogen atmosphere was established and maintained in the flask for the remainder of the reaction. Charge F was added to the reaction flask followed by a 30 minute addition of charge G. The temperature rose exothermically to 60° C. Charge H was then added. The final dispersion had a Brookfield viscosity of 225 centipoise, an acid value of 8.8, a pH of 7.52, and a nonvolatile content of 43.2%.

Example 3

Preparation and Evaluation of Coating Compositions

Part A: A polyester was prepared according to Example A1 of EP 1,454,971 B1 as follows: In a reactor equipped with a stirrer, a water separator and a control unit for the temperature, the following components were mixed and heated to 185° C.: 1732 grams of TERATHANE® (polytetramethylene ether glycol having a number average molecular weight of 650 g/mol, commercially available from DuPont), and 307 grams of trimellitic anhydride. Upon reaching a carboxyl group content of 0.713 mmol/g (acid number=40 mg KOH/g), the reaction temperature is lowered to 175° C. The reaction is continued until reaching a carboxyl group content of 0.535 mmol/g (acid number=30 mg KOH/g). The Gardner-Holdt viscosity of the resin solution at 60% strength in butoxyethanol was V. After cooling, the polyester melt to 85° C., 552 grams of a 10% aqueous dimethylethanolamine solution was added followed by 2390 grams of deionized water. A finely divided dispersion was formed having a nonvolatile content of 40% and an acid number of 29 mg KOH/g.

Part B: A coating composition was prepared with the components described in Table 3. The percentage of each component is based on the total solutions weight of the composition.

TABLE 3

| Component | Amount (grams) |
|---|---|
| Latex of Example 2 | 197.03 |
| Polyester polyol[3] | 28.57 |
| FOAMASTER ® MO 2111[4] | 0.50 |
| Carbon black dispersion[5] | 4.96 |
| CARBODILITE ® V-02-L2[6] | 7.50 |
| BYK-348[7] | 0.25 |

[3]Polyester polyol prepared in Part A of Example 3.
[4]Defoamer, commercially available from BASF Corporation.
[5]Carbon black pigment dispersed in an aqueous medium.
[6]Waterborne carbodiimide crosslinker, commercially available from Nisshinbo Chemical, Inc.
[7]Silicone surfactant, commercially available from BYK.

The coating composition was prepared by combining the components listed in Table 3 in an appropriate sized container for 15 minutes. The mixture was then allowed to stand (equilibrate) overnight (about 12 to 16 hours).

After preparing the coating composition, ply rubber sheet tabs were heated. The coating composition was applied to the heated rubber tabs. The coating composition applied to the rubber tabs was then cured for 12 hours at 180° F.

The resulting coating had an adhesion of 0.279 N/mm. Adhesion was determined with an Instron Model 4443 manufactured by Instron® following the instructions contained in the Instron Model 4443 manual to measure peel strength of a rectangular sample 10 mm wide, peeled at 50 mm/minute, at an angle of 180° from the substrate.

The resulting coating also had an oxygen permeance of 22.2 cc·mm/m$^2$·day·atm at 23° C. and 50% relative humidity. Oxygen permeance was tested using an OX-TRAN® 1/50 test system (commercially available from Mocon Inc.) in accordance with ASTM method F1927-14. In addition, the resulting coating had an elongation at break of 420%. The elongation at break is reported as the amount of elongation in percentage a coating can withstand prior to breaking or cracking at ambient conditions as determined with an INSTRON® model Mini44 unit (commercially available from Instron Corp.) at a strain rate of 50 mm/minute.

Example 4

Preparation and Evaluation of Coating Compositions

A coating composition was first prepared with the components described in Table 4. The percentage of each component is based on the total solutions weight of the composition.

TABLE 4

| Component | Amount (grams) |
| --- | --- |
| Latex of Example 2 | 188.33 |
| Polyester polyol[3] | 28.57 |
| FOAMASTER ® MO 2111[4] | 0.50 |
| CYMEL ® 385[8] | 4.22 |
| Carbon black dispersion in water[5] | 4.96 |
| CARBODILITE ® V-02-L2[6] | 7.50 |
| BYK-348[7] | 0.25 |

[8] A methylated high imino melamine resin with a low degree of alkylation, commercially available from Allnex.

The coating composition was prepared by combining the components listed in Table 4 in an appropriate sized container for 15 minutes. The mixture was then allowed to stand (equilibrate) overnight (about 12 to 16 hours).

After preparing the coating composition, ply rubber sheet tabs were heated. The coating composition was applied to the heated rubber tabs. The coating composition applied to the rubber tabs was then cured for 7 hours at 180° F. The rubbers sheet tabs were not heated, cleaned, or scuffed.

The resulting coating had an adhesion of 0.637 N/mm. Adhesion was determined with an Instron Model 4443 manufactured by Instron® following the instructions contained in the Instron Model 4443 manual to measure peel strength of a rectangular sample 10 mm wide, peeled at 50 mm/minute, at an angle of 180° from the substrate.

The resulting coating also had an oxygen permeance of 23.8 cc·mm/m$^2$·day·atm at 23° C. and 50% relative humidity. Oxygen permeance was tested using an OX-TRAN® 1/50 test system (commercially available from Mocon Inc.) in accordance with ASTM method F1927-14.

In addition, the resulting coating had an elongation at break of 434%. The elongation at break is reported as the amount of elongation in percentage a coating can withstand prior to breaking or cracking at ambient conditions as determined with an INSTRON® model Mini44 unit (commercially available from Instron Corp.) at a strain rate of 50 mm/minute.

Whereas particular embodiments of this invention have been described above for purposes of illustration, it will be evident to those skilled in the art that numerous variations of the details of the present invention may be made without departing from the invention as defined in the appended claims.

The invention claimed is:

1. An elastic barrier coating composition comprising:
    (a) an aqueous dispersion of core-shell particles, the core-shell particles comprising a polymeric core at least partially encapsulated by a polymeric shell,
    wherein the polymeric shell comprises: (i) a barrier segment comprising aromatic groups, urethane linkages, and optionally urea linkages, wherein the aromatic groups, the urethane linkages, and the optional urea linkages are formed within a backbone of the polymeric shell; and (ii) an elastomeric segment that is different from (i) and comprises at least ester linkages, ether linkages, or combinations thereof that are formed within the backbone of the polymeric shell, the barrier segment comprises at least 30 weight % of the polymeric shell based on the total solids weight of the polymeric shell, and wherein the polymeric shell is covalently bonded to at least a portion of the polymeric core; and
    (b) an elastomeric polymer that is different from (a).

2. The elastic barrier coating composition of claim 1, wherein the polymeric core has a glass transition temperature of less than 25° C.

3. The elastic barrier coating composition of claim 1, wherein the polymeric core comprises a (meth)acrylate polymer, a vinyl polymer, or a combination thereof.

4. The elastic barrier coating composition of claim 1, wherein the polymeric shell of the core-shell particles comprises hydroxyl functional groups, carboxylic acid functional groups, or combinations thereof.

5. The elastic barrier coating composition of claim 1, wherein the elastomeric segment of the core-shell particles has a glass transition temperature of less than −20° C.

6. The elastic barrier coating composition of claim 1, wherein the elastomeric segment of the core-shell particles further comprises sulfide linkages, natural rubber, synthetic rubber, or combinations thereof.

7. The elastic barrier coating composition of claim 1, wherein the barrier segment of the core-shell particles has a glass transition temperature of greater than 0° C.

8. The elastic barrier coating composition of claim 1, wherein the polymeric shell comprises at least 75 weight % of the core-shell particles, based on the total solids weight of the core-shell particles.

9. The elastic barrier coating composition of claim 1, wherein the core-shell particles are obtained from a mixture of reactants comprising:
    (i) a polymer comprising an ethylenically unsaturated group, aromatic groups and urethane linkages, and optionally urea linkages; and
    (ii) ethylenically unsaturated monomers.

10. The elastic barrier coating composition of claim 1, wherein the elastomeric polymer of (b) has a glass transition temperature of less than 0° C.

11. The elastic barrier coating composition of claim 1, wherein the elastomeric polymer of (b) comprises a polyester, a polyether, a polysulfide, natural rubber, synthetic rubber, copolymers thereof, or combinations thereof.

12. The elastic barrier coating composition of claim 1, further comprising a crosslinker reactive with at least the core-shell particles.

13. The elastic barrier coating composition of claim 12, wherein the crosslinker comprises a carbodiimide.

14. The elastic barrier coating composition of claim 12, further comprising at least two different crosslinkers, and wherein at least one of the crosslinkers is reactive with at least the core-shell particles.

15. The elastic barrier coating composition of claim 14, wherein a first crosslinker comprises a carbodiimide and a second crosslinker comprises an aminoplast, a hydroxyalkyl urea, a hydroxyalkyl amide, a blocked isocyanate, or a combination thereof.

16. A substrate at least partially coated with a coating formed from the elastic barrier coating composition of claim 1.

17. The substrate of claim 16, wherein the substrate comprises an elastomeric substrate.

18. The substrate of claim 16, wherein the substrate is a tire.

* * * * *